US010122758B2

(12) United States Patent
Nandakumar et al.

(10) Patent No.: US 10,122,758 B2
(45) Date of Patent: Nov. 6, 2018

(54) DYNAMIC MANAGEMENT OF ENTERPRISES POLICIES

(71) Applicant: CA, Inc., New York, NY (US)

(72) Inventors: Vikrant Nandakumar, Bangalore (IN); Naveen Harry Michael, Bangalore (IN); Hemanth Kumar Pinninti, Vizianagaram (IN)

(73) Assignee: CA, Inc., New York, NY (US)

( * ) Notice: Subject to any disclaimer, the term of this patent is extended or adjusted under 35 U.S.C. 154(b) by 182 days.

(21) Appl. No.: 14/817,865

(22) Filed: Aug. 4, 2015

(65) Prior Publication Data

US 2017/0041344 A1 Feb. 9, 2017

(51) Int. Cl.
*H04L 29/06* (2006.01)
*H04W 12/08* (2009.01)

(52) U.S. Cl.
CPC ............ *H04L 63/20* (2013.01); *H04L 63/102* (2013.01); *H04W 12/08* (2013.01)

(58) Field of Classification Search
CPC ..... H04L 63/20; G06F 21/6281; G06F 21/50; G06F 21/51
See application file for complete search history.

(56) References Cited

U.S. PATENT DOCUMENTS

| | | | |
|---|---|---|---|
| 2008/0016104 A1 | 1/2008 | Kuehr-McLaren et al. | |
| 2013/0290709 A1* | 10/2013 | Muppidi | H04W 12/08 713/168 |
| 2015/0163247 A1* | 6/2015 | Kapoor | G06F 21/51 726/1 |
| 2016/0308905 A1* | 10/2016 | Stiekes | H04L 63/20 726/1 |

* cited by examiner

*Primary Examiner* — Benjamin E Lanier
*Assistant Examiner* — Paul E Callahan
(74) *Attorney, Agent, or Firm* — Sage Patent Group

(57) ABSTRACT

A method includes receiving a notice of a policy violation of an enterprise usage policy by a managed application on a user device wherein the managed application is managed by a mobile application management module on the user device, retrieving the enterprise usage policy from a policy database. The method further includes determining a modification precedence of the active condition and the active restriction, selecting one of the active condition and the active restriction for modification in response to the modification precedence, modifying the selected one of the active condition and the active restriction in response to the notice of the policy violation to provide a modified enterprise usage policy, and transmitting the modified enterprise usage policy to the user device.

20 Claims, 10 Drawing Sheets

DYNAMIC MANAGEMENT OF ENTERPRISES POLICIES

FIELD

The inventive concepts described herein relate to software applications for mobile computing devices. In particular, the inventive concepts relate to mobile application management software that enables enterprise-wide management of mobile applications.

BACKGROUND

Mobile Application Management (MAM) is a class of software applications that enable enterprises to monitor the usage and performance of mobile applications, i.e., applications developed for mobile devices, during runtime. MAM applications can provide visibility into the use and operation of mobile applications, and can produce data that can be used to manage the application, to respond to crash reports, and/or to identify new features for the application.

MAM applications can also be used to enforce enterprise policies that govern the use of the application. Enterprise policies can, for example, define the conditions under which a mobile application can be used and the resources that the mobile application can utilize. For example, an enterprise policy can limit the ability of a mobile application to access certain networks, to use certain features of a mobile device, such as its camera, microphone or speaker, etc.

Mobile applications are typically distributed in an application package containing the elements needed to run the application, such as the program code, resources, certificates and a manifest. A management application, such as an MAM application, can be attached to the mobile application by modifying the program code of the application to include the MAM code. This modification is referred to as "application wrapping." When an application is wrapped, a layer of code is added to the application binary file to add features or modify behavior of the application without making changes to the internal application code.

MAM applications can also exist as standalone applications, i.e. not as application wrappers that encapsulate another program, on a mobile computing device.

SUMMARY

A method according to some embodiments includes receiving, at a policy management server, a notice of a policy violation of an enterprise usage policy by a managed application on a user device. The enterprise usage policy is administered by the policy management server and the managed application is managed by a mobile application management module on the user device. The enterprise usage policy includes an action, an active condition selected from a plurality of conditions that range in breadth from a least narrow condition to a most narrow condition, and an active restriction selected from a plurality of restrictions that range in breadth from a least narrow restriction to a most narrow restriction. The method further includes retrieving the enterprise usage policy from a policy database, determining a modification precedence of the active condition and the active restriction, selecting one of the active condition and the active restriction for modification in response to the modification precedence, modifying the selected one of the active condition and the active restriction in response to the notice of the policy violation to provide a modified enterprise usage policy, and transmitting the modified enterprise usage policy to the user device.

Modifying the active condition may include changing the active condition to a less narrow condition among the plurality of conditions and/or changing the active restriction to a more restrictive restriction among the plurality of restrictions.

The method may further include updating the modification precedence after selecting one of the active condition and the active restriction for modification.

The enterprise usage policy may apply to a selected class of users selected from a plurality of classes of users ranging from a narrowest class of users to a broadest class of users, and the method may further include modifying the enterprise usage policy to apply to a broader class of users than the selected class of users. The narrowest class of users may comprise a single user.

The method may further include denying access to the managed application on the user device in response to the notice of the policy violation by the managed application. In some embodiments, the method may include denying access to a hardware feature on the user device in response to the notice of the policy violation by the managed application.

The enterprise usage policy may include a geographical condition and/or a temporal condition.

The method may include monitoring the user device for further policy violations; in response to determining that further policy violations have not occurred, restoring the selected one of the active condition and the active restriction to a previous level; and transmitting the restored enterprise usage policy to the user device.

Other methods, computer program products, and/or electronic devices according to embodiments of the present disclosure will be or become apparent to one with skill in the art upon review of the following drawings and detailed description. It is intended that all such methods, computer program products, and/or electronic devices be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION OF EMBODIMENTS

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Figure 1A:
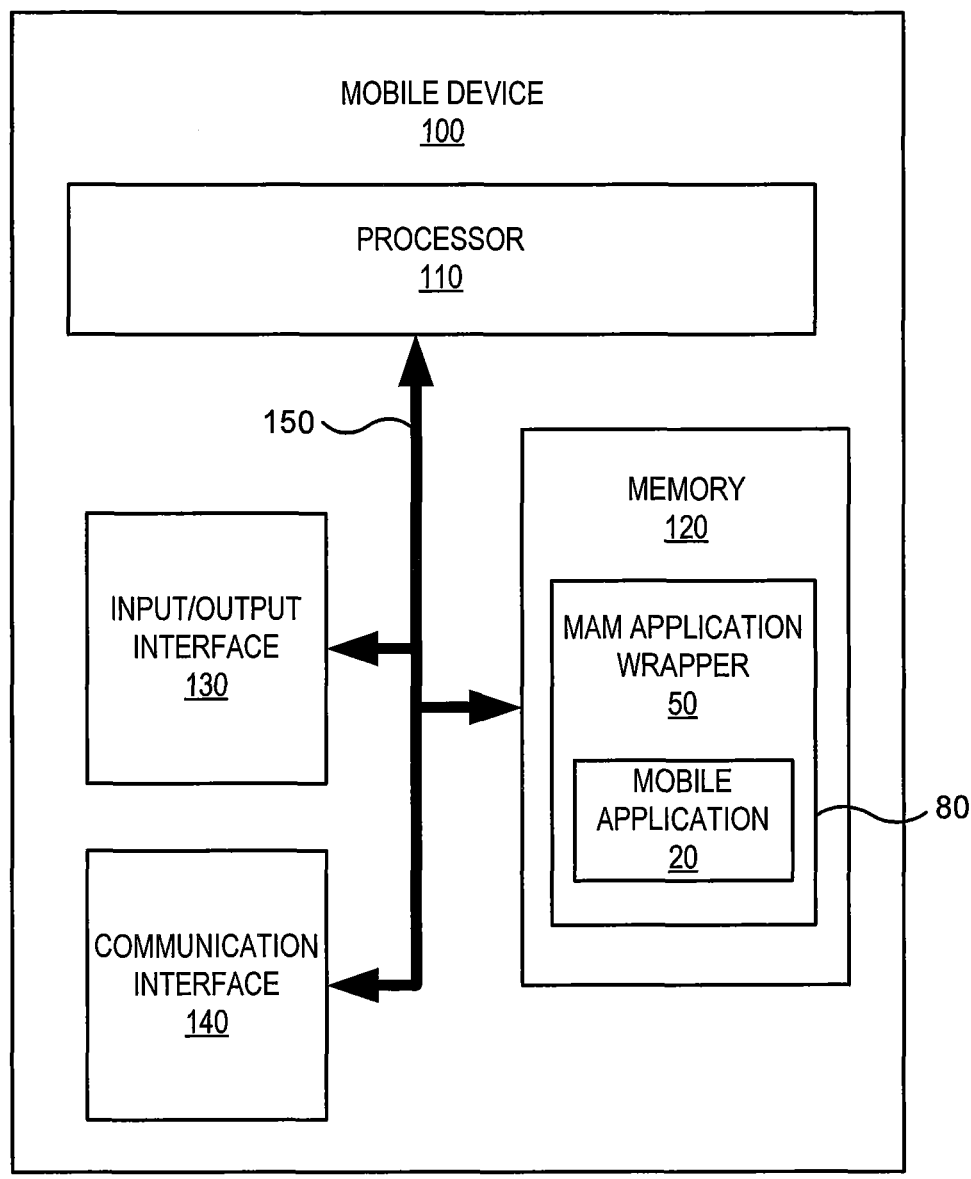
FIGS. 1A and 1B are block diagrams illustrating mobile computing devices configured according to some embodiments.

FIG. 1A illustrates a mobile computing device 100 on which an application program 20 is installed. The application program is encapsulated by a mobile application management (MAM) application wrapper 50. The computing device 100 includes a processor 110, such as a microprocessor, microcontroller, etc., that controls operation of the device 100. The processor 110 communicates with a memory 120, an input/output interface 130 and a communication interface 140 via a system bus 150. A mobile application 20 is installed in the memory 120 of the computing device 100. The mobile application 20 is encapsulated by an MAM application 50 installed as an application wrapper that encloses the application code 20 of the mobile application to provide a wrapped mobile application 80.

Figure 1B:
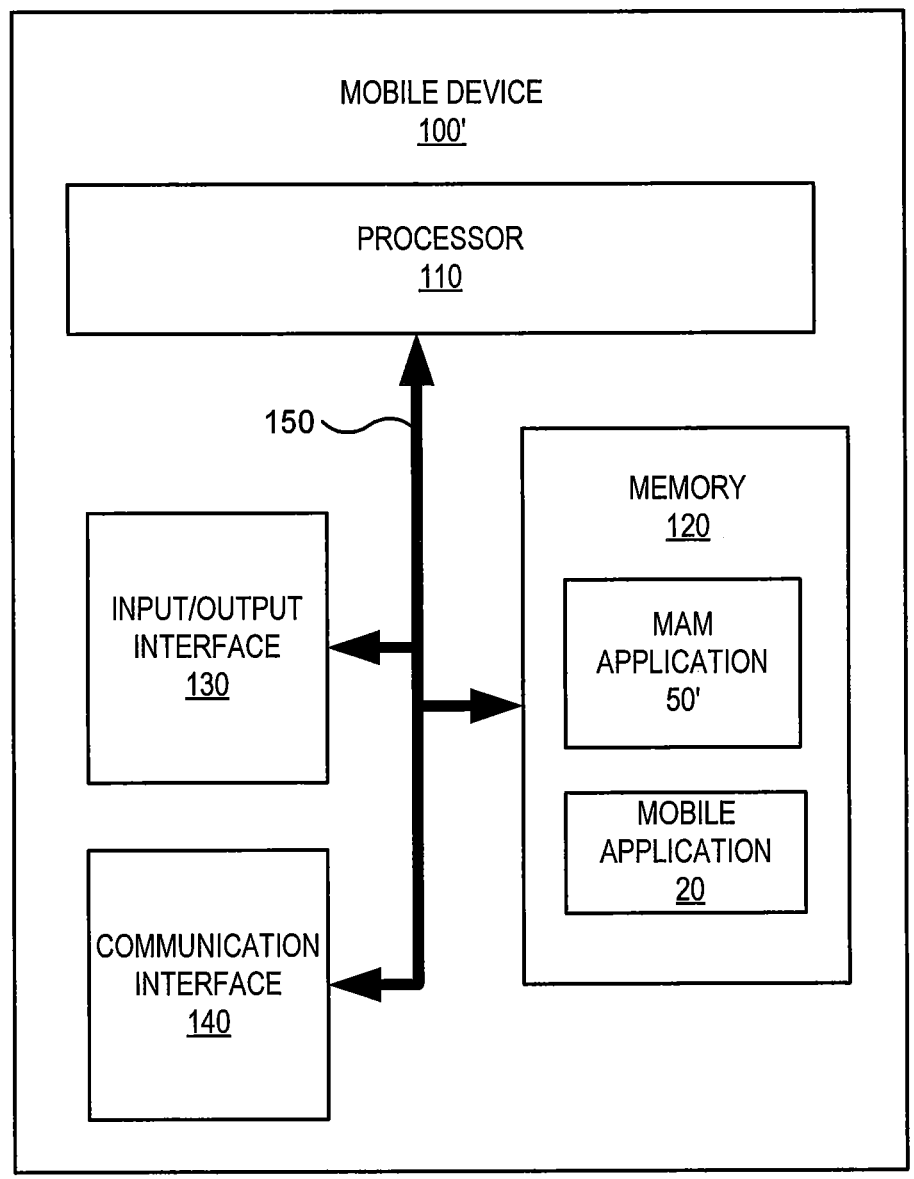

FIG. 1B illustrates a mobile computing device 100' on which an application program 20 an a standalone MAM application 50' are installed. The computing device 100 also includes a processor 110 that communicates with a memory 120, an input/output interface 130 and a communication interface 140 via a system bus 150.

Figure 2:
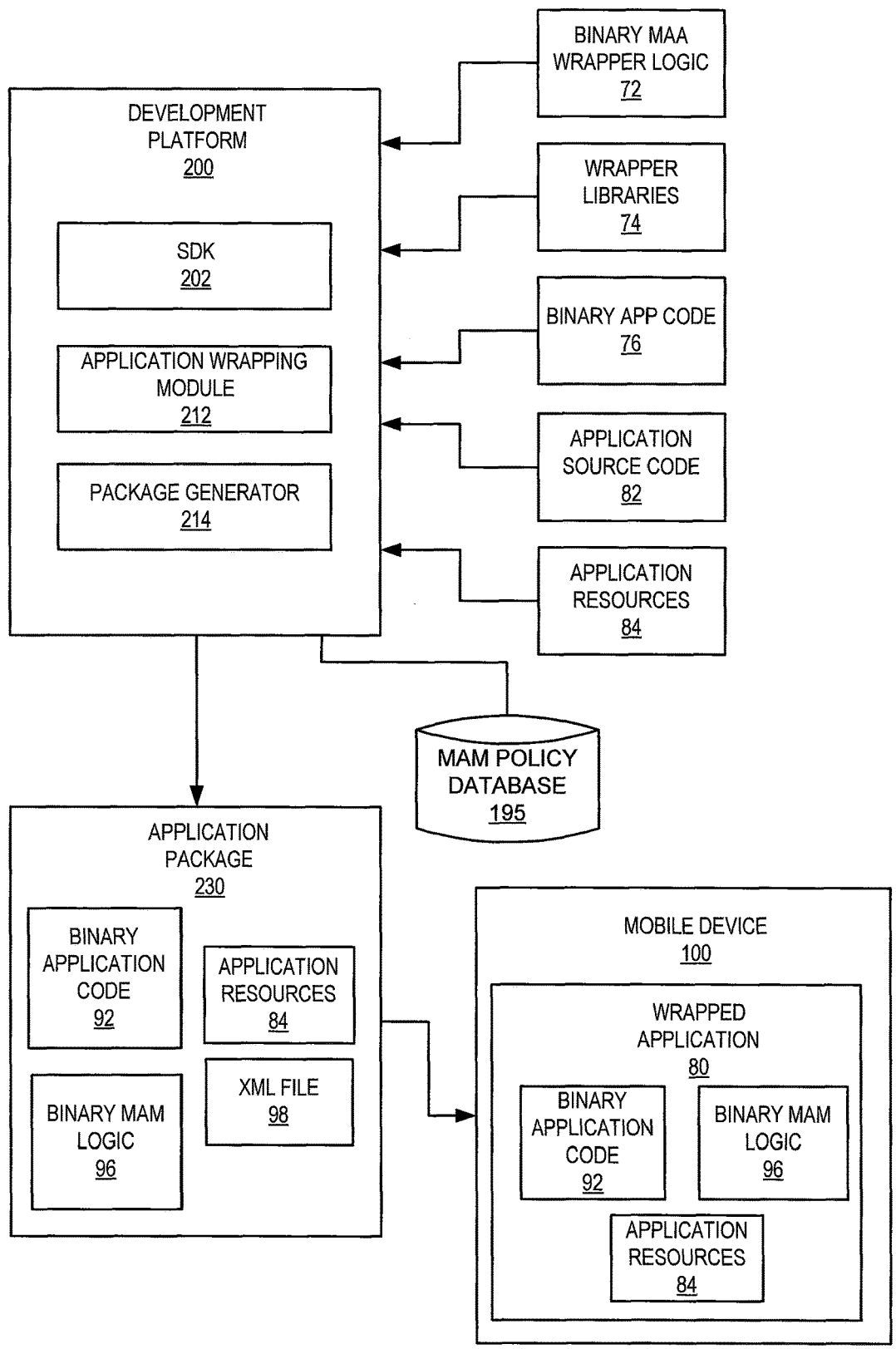
FIG. 2 is a block diagram illustrating the packaging and installation of an application on a mobile computing device using a software development platform.

FIG. 2 illustrates a development platform 200 for generating an application installation package 230 including an MAM application wrapper. The application installation package 230 is used to install the mobile application 20 including the MAM application 50 on a mobile device 100.

The development platform 200 may include a software development kit (SDK) 202 that enables an application developer to wrap a mobile application with an application wrapper that performs one or more of the functionalities described herein. As described herein, an application wrapper can be applied to a mobile application by modifying the application's source code, linking to predefined "hooks" in the application's object code, or any other software connection to an application's code. The development platform 200 can be implemented on any suitable computer hardware. A software developer can create an application by generating program code and compiling it into an executable program compatible with a mobile device 100.

The SDK 202 can include a library of development tools that provide various different functionalities. The development tools can include a source code editor with an integrated debugger, along with code snippets, data structures, protocols, routines, and the like. The SDK 202 can include an application programming interface (API) that enables an application to interface with the development tools. The SDK 202 can include a compiler for converting source code into machine-readable object code. It will be appreciated that the SDK 202 can include other features in addition to these, and need not include all of the illustrated features.

Figure 3:
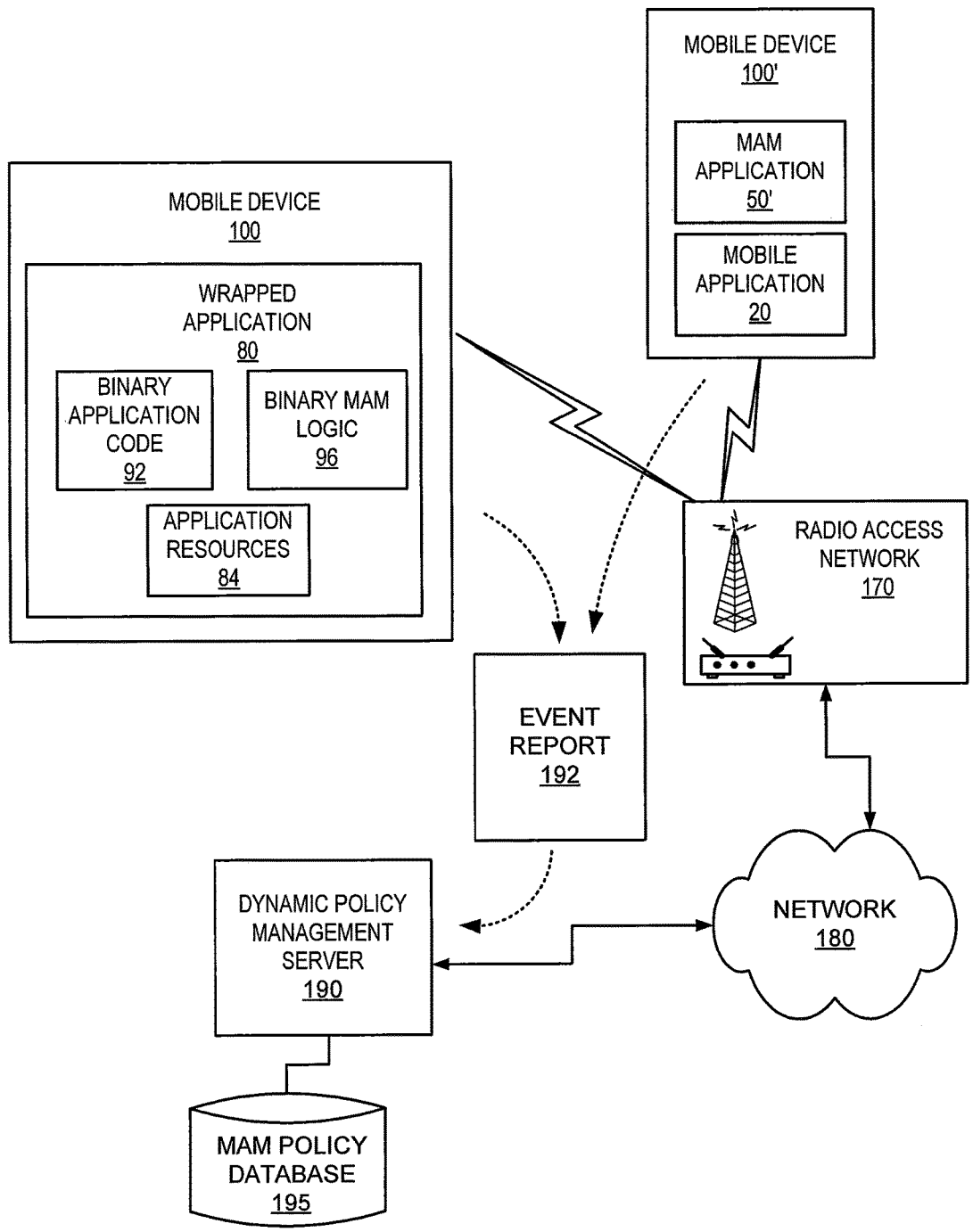
FIG. 3 is a block diagram illustrating the transmission of an event report from a mobile computing device to an dynamic policy generation server according to some embodiments.

The development tools can include tools for wrapping a mobile device software application. For example, in some embodiments, the SDK 202 includes a development tool that allows an application developer to wrap an application with an MAM application that monitors the operation of the mobile application and enforces enterprise policies regarding the use of the application. The MAM application can perform other functions, such as application fault detection, application performance measurement, and the detection of reportable events, such as device crashes, hangs and freezes, during the operation of the mobile application. The MAM functionality can include the logging of detected violations of an enterprise policy. The MAM application may report such violations to a network resource, such as a policy management server 190 (FIG. 3).

FIG. 2 further illustrates the generation and installation of an application package on a mobile device 100 using a development platform 200 according to some embodiments.

The development platform 200 may receive as inputs binary MAM application wrapper logic 72, application wrapper libraries 74, binary mobile application code 76, mobile application source code 82 and application resources 84. It will be appreciated that the binary MAM application wrapper logic 72 and the application wrapper libraries 74 may be developed and compiled on the development platform 200, or may be developed and compiled externally to the development platform 200. The binary MAM application wrapper logic 72 is the binary code of the MAM application 50. The application wrapper libraries 74 are software libraries that support the function of the MAM application code. The binary application code 76 is the executable code of the mobile application, while the application source code 82 is the source code of the mobile application.

In some embodiments, the development platform 200 may compile and link the application source code 82 to generate the binary application code 76.

In addition to the SDK 202, the development platform 200 may include a number of other functional modules, including an application wrapping module 212 and a package generator 214. It will be appreciated that the application wrapping module 212, and the package generator 214 may be provided as part of or separately from the SDK 202.

The application wrapping module generates 212 a wrapped mobile application by linking the binary application code 76 of the mobile application with the binary MAM application wrapper logic 72 along with the wrapper libraries 72 and any other included libraries to form binary application code 92 and binary MAM wrapper logic 96.

The package generator 214 generates an application installation package 230 for installing the mobile application on a mobile device. The application installation package 230 may include the binary application code 92 of the mobile application, and the binary MAM wrapper logic 96 of the MAM application along with application resources 84 and a manifest file 98 that contains a manifest of the application installation package. The manifest file 98 may be an XML file.

During the installation process, the application package 230 is provided to a mobile device 100, which extracts and installs the various components of the application package 230 according to instructions contained in the manifest 98. After installation, the mobile device 100 includes a wrapped application 80 that includes both the binary application code 92 of the mobile application along with the binary wrapper logic 96 of the MAM application. The wrapped application 80 also include the application resources 84.

After the package generator 214 has generated the application installation package 230 including the binary application code 92 of the mobile application, the binary MAM wrapper logic 96 of the MAM application, the application resources 84 and the manifest 98, the application installation package 230 is distributed to the mobile device 100. Upon installation, the binary application code 92, the binary MAM wrapper logic 96, and the application resources 84 are stored in the mobile device 100 as a wrapped application 80.

Operation of a mobile computing device 100 including an application 80 that includes MAM logic 96 and a mobile computing device 100' including a mobile application 20 and a standalone MAM application 50' are illustrated in FIG. 3. In FIG. 3, the mobile application 80 is installed and operating on the mobile device 100. From time to time, an event may occur during the operation of the mobile application that the binary MAM logic 96 or the MAM application 50' determines is a violation of an enterprise policy that should be reported to dynamic policy management server 190. Such an event is referred to herein as a "policy violation." Policy violations may be reported to the dynamic policy management server 190 so that IT personnel can collect statistics on the occurrence of policy violations. In addition, as described in more detail below, the dynamic policy management server 190 may analyze the policy violation and dynamically update one or more enterprise policies relating to the mobile device 100 and/or a registered user of the mobile device 100.

When a policy violation is detected, the MAM logic 96/MAM application 50' may send an event report 192 to the dynamic policy management server 190. In a typical embodiment illustrated in FIG. 3, the mobile device 100 may communicate over a radio access network 170 that is connected to a data communication network 180, such as the Internet. The dynamic policy management server 190 may also communicate with the data communication network 180. The MAM logic 96/MAM application 50' may thus transmit the event report to the application analysis computer 190 over the radio access network 170 and the data communication network 180.

The event report 192 describes the policy violation and identifies the mobile device on which the violation occurred. The event report 192 may also include other information about the policy violation, such as the date, time and location of the mobile device when the violation occurred, the applications active on the device when the violation occurred, the name and version of the wrapped application 80 that encountered the policy violation, and the version of the MAM that reported the violation. Other data may be included in the event report as desired.

Figure 4:
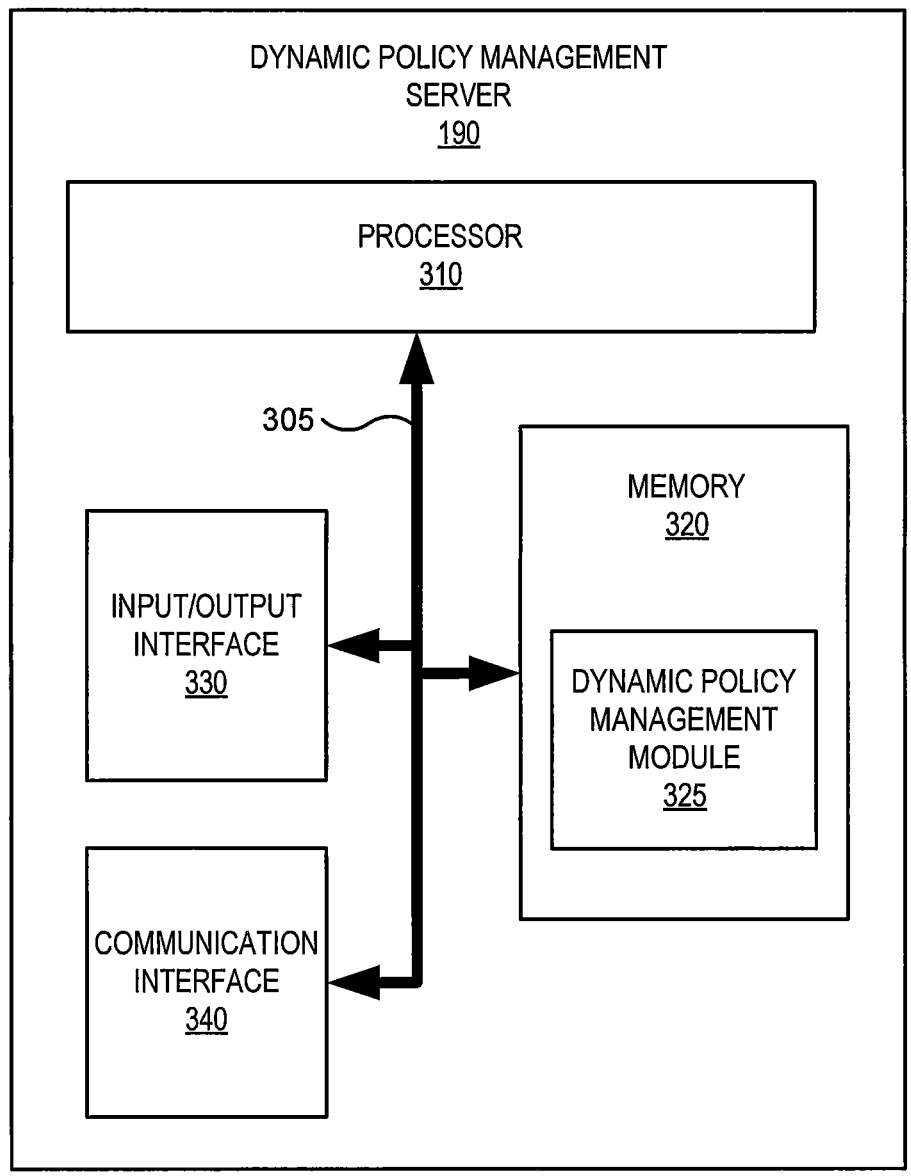
FIG. 4 is a block diagram illustrating a dynamic policy generation server according to some embodiments.

FIG. 4 illustrates a dynamic policy management server 190. The policy management server may be implemented using a general purpose programmable digital computer, and may include a processor 1000, such as a microprocessor, microcontroller, etc., that controls operation of the computer 190. The processor 1000 communicates with a memory 1120, an input/output interface 1130 and a communication interface 1140 via a system bus 1150. A dynamic policy management module 1150 is installed in the memory 1120 of the dynamic policy management server 190 and performs the functions described herein with respect to analysis of policy violations and modification of enterprise policies in response to policy violations.

Figure 5:
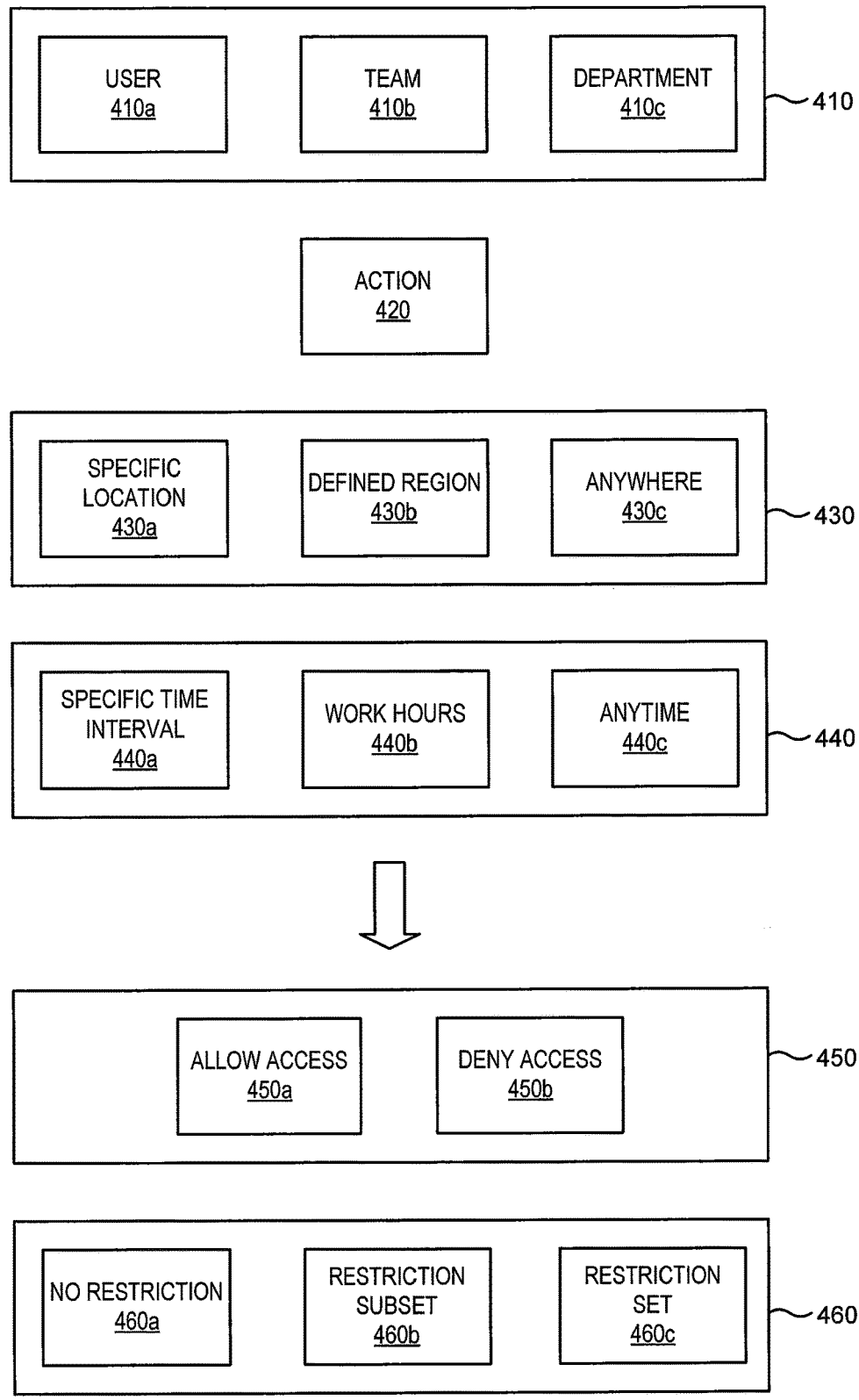
FIGS. 5, 6A, 6B, and 7 are block diagrams illustrating an enterprise policy according to some embodiments.

An enterprise policy is illustrated schematically in FIG. 5. The enterprise usage policy applies to an action 420 that may be taken by a managed application on a mobile device or mobile devices assigned to members of a user set 410. The user set 410 may include an individual user 410a, a defined team or group of users 410b, a department 410c, or even to all users.

The enterprise policy includes one or more active conditions selected from a group of conditions 430, 440 that range in breadth from a least narrow condition to a most narrow condition. The active condition refers to a condition that applies to the action. For example, the active condition may define a time period 440 in which the action is taken or attempted, a geographic location 430 of the mobile device when the action is taken or attempted, or other condition of the action. As shown in FIG. 4, the time period condition may, for example, be a specific time interval 440a, standard working hours 440b, any time, 440c, or any other time interval. The geographic location condition may include a specific geographic location 430a, such as a building or a plant, a defined geographic region 430b, or anywhere 430c.

The policy further defines a result 450 that occurs if the defined action is taken by a member of the defined user set within the defined conditions. The result may be either to allow access 450a or to deny access 450b.

The policy further includes an active restriction 460, that is, a restriction that may be applied to the action if the action is permitted. The active restriction is selected from a plurality of restrictions that range in breadth from a least narrow restriction 460a to a most narrow restriction 460c, which may be a set of multiple restrictions. The restrictions may include allowing access on only a particular network, restricting access to particular hardware and/or software features, such as a camera, microphone or speaker of the mobile device, limiting the amount of bandwidth available for the feature, etc.

Figure 6A:
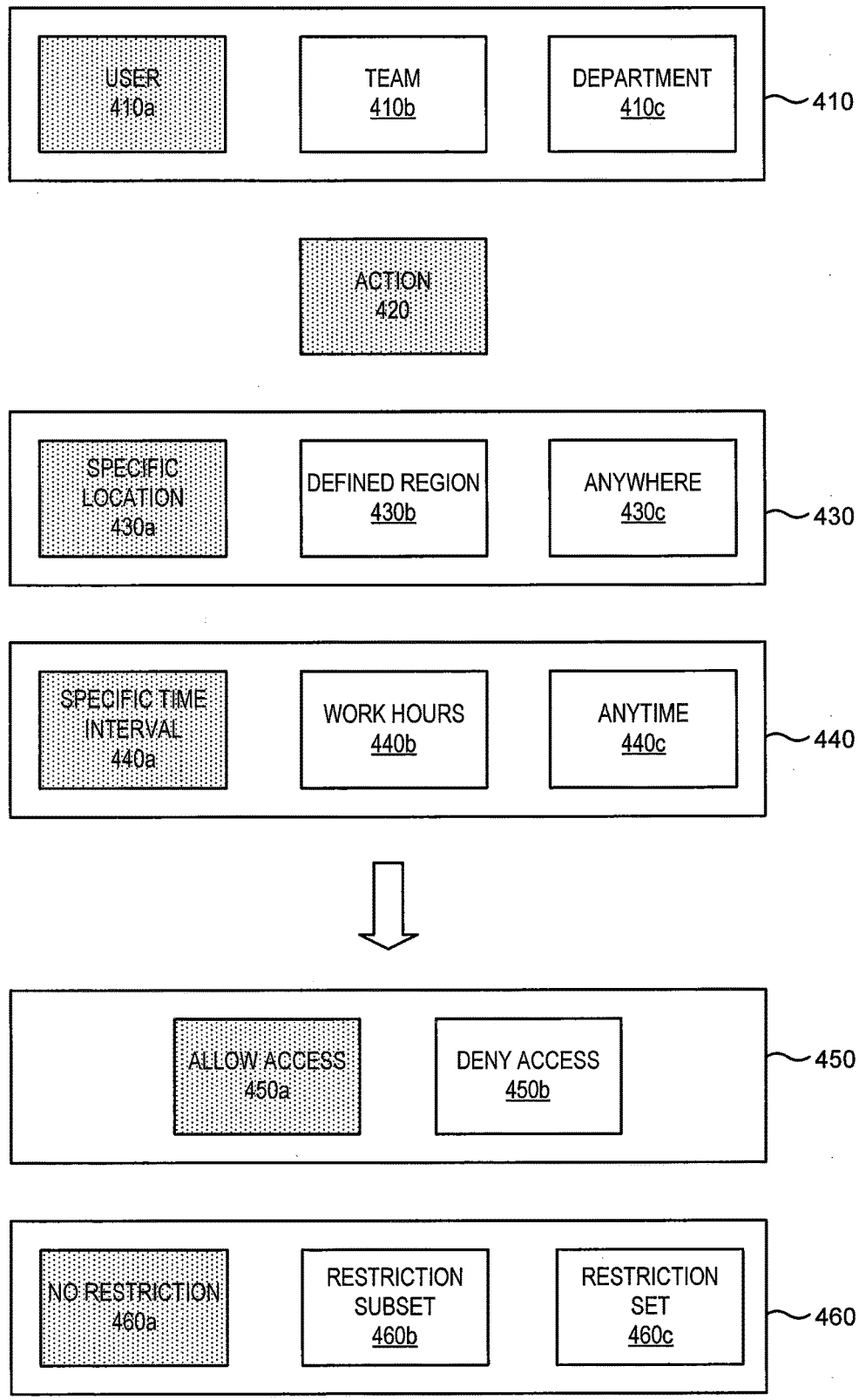

Referring to FIG. 6A, a particular policy may be constructed by selecting a particular user set 410, action 420, condition 430, 440, result 450 and restriction 460. In FIG. 6, the selected items are shown as shaded boxes. Thus, in the example shown in FIG. 6, the defined policy applies to an action 420 taken by a particular user 410a in a specific location 430a during a specific time interval 440a. If the action is taken by the user 410a in the specific location 430a during the specific time interval 440a, the policy allows the action with no restriction 460a.

Figure 6B:
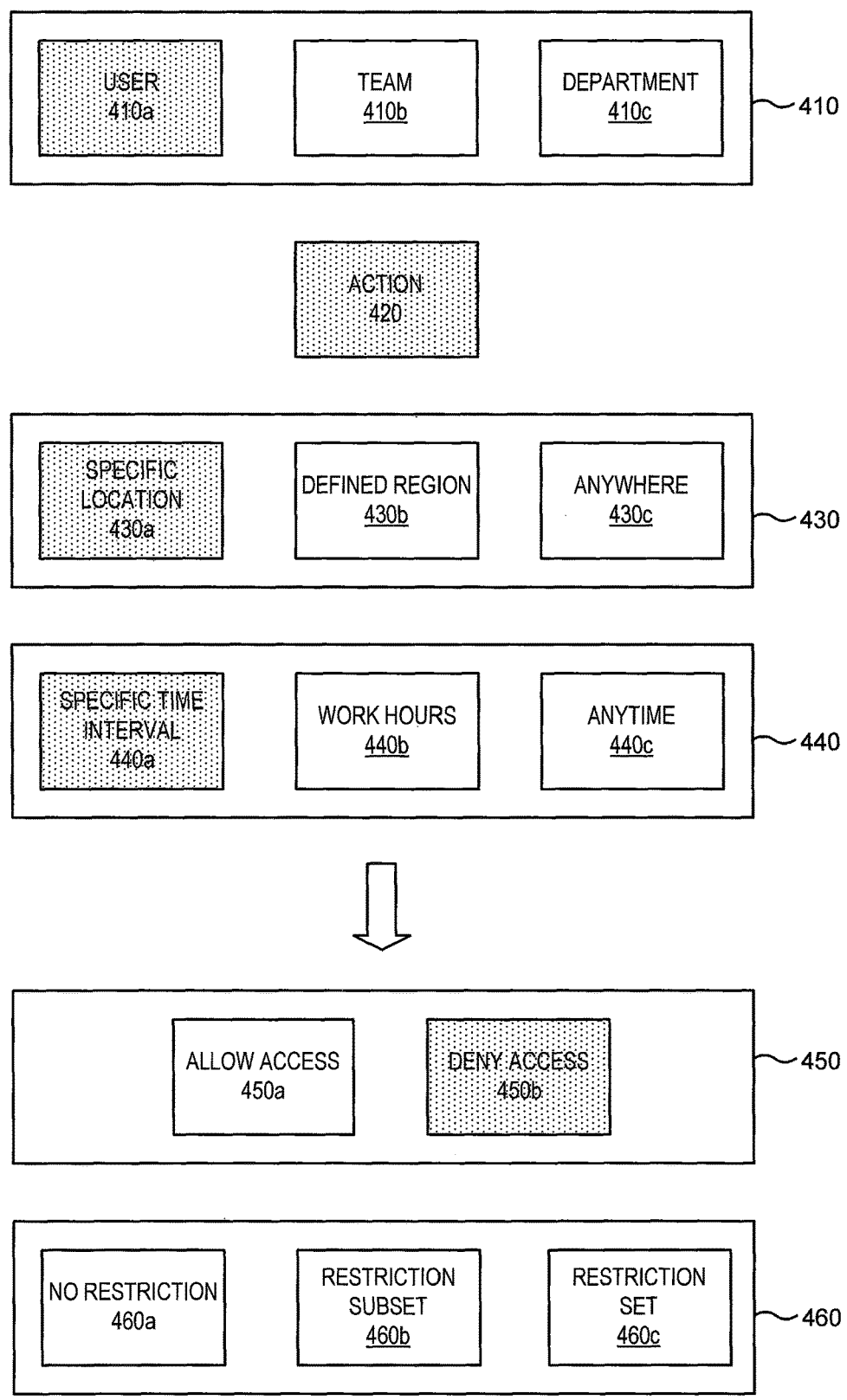

FIG. 6B illustrates an example of a policy that denies access to an action that is taken within the defined condition, i.e., by the user 410a in the specific location 430a during the specific time interval 440a. If the user attempts to take the action while in the specific location 430a during the specific time interval 440a, a policy violation may be recorded, and an event report 192 may be generated notifying the dynamic policy management server 190 of the policy violation (FIG. 3).

When a policy violation is reported to the dynamic policy management server 190, the dynamic policy management server 190 may first retrieve the policy from the MAM policy database 195.

Next the dynamic policy management server 190 determines a modification precedence of the active conditions and the active restrictions. That is, the dynamic policy management server 190 determines which of the active conditions and/or active restrictions should be modified in response to the policy violation. The dynamic policy management server 190 may determine that only one or that more than one of the active conditions and/or active restrictions should be modified in response to the policy violation. The dynamic policy management server 190 may take into account a severity of the violation, the number and severity of previous violations by the user, if any, the number and severity of violations of the policy by other users, or any other relevant information.

Figure 7:
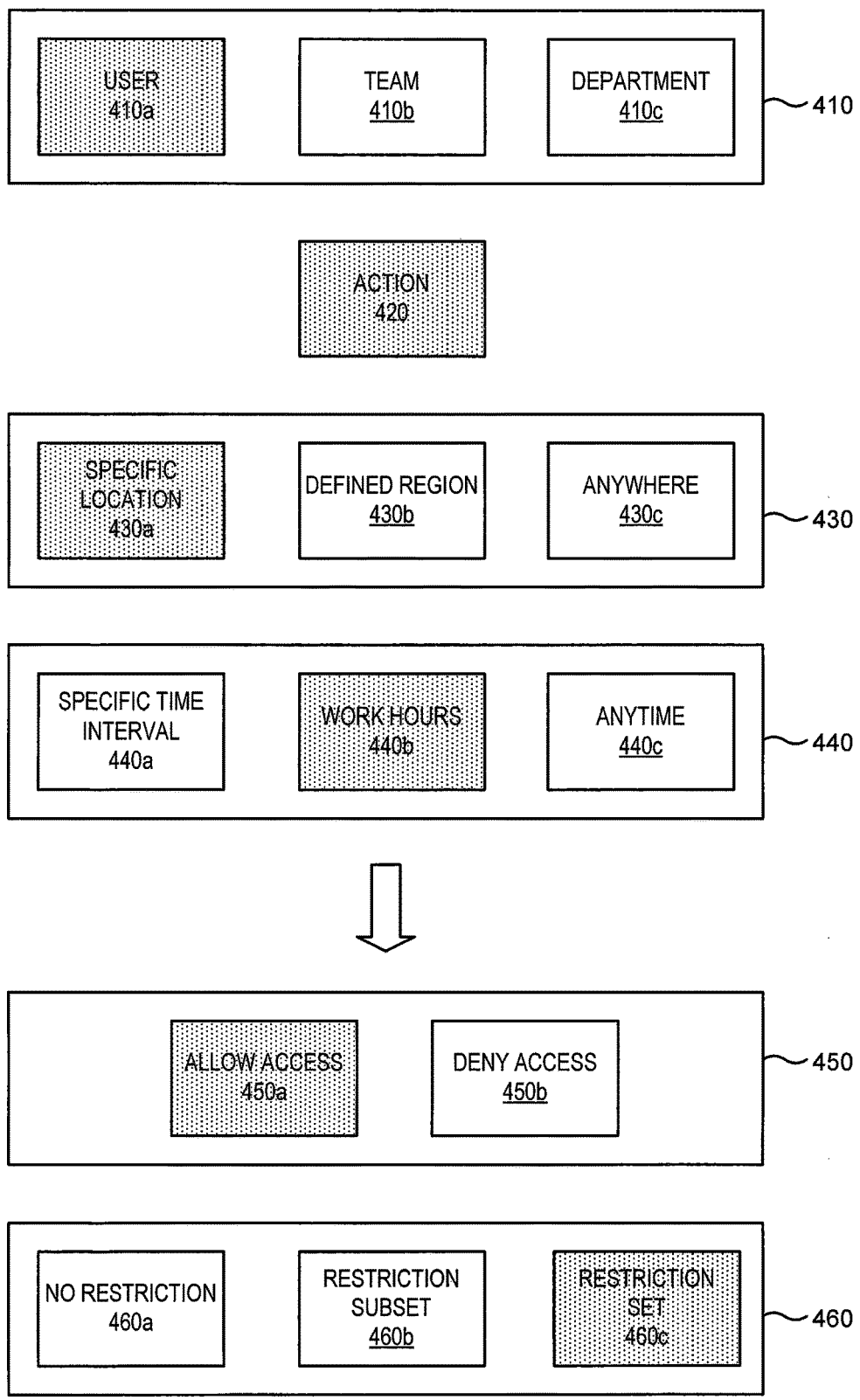

The dynamic policy management server 190 then selects at least one of the active condition and the active restriction for modification in response to the modification precedence, and modifies the selected one of the active condition and the active restriction in response to the notice of the policy violation to provide a modified enterprise usage policy. For example, assuming that a user 410a violated the policy shown in FIG. 6a by, for example, attempting to exceed a restriction defined for the action 420, the dynamic policy management server 190 may modify the policy to be as shown in FIG. 7. As shown in FIG. 7, the condition 440 is changed from a less restrictive condition 440a in the version of the policy shown in FIG. 6A to a more restrictive condition 440b in the version of the policy shown in FIG. 7. In addition, the restriction 460 is changed from a less intrusive restriction 460a in the version of the policy shown in FIG. 6A to a more intrusive (or restrictive) restriction 460c in the version of the policy shown in FIG. 7. The modified enterprise policy is then transmitted to the MAM application 50 on the mobile device 100, which monitors the mobile application 20 based on the modified enterprise policy.

As is apparent from the foregoing description, the active condition may be changed to a less narrow condition among the plurality of conditions and/or changing the active restriction to a more restrictive restriction among the plurality of restrictions in response to a policy violation. Thus, the revised policy may be invoked on more occasions (due to a less narrow condition) and/or have more intrusive effects (due to a more restrictive restriction) than the original policy.

After the active condition and/or the active restriction is selected for modification, the dynamic policy management server 190 may update the modification precedence of the active restrictions and active conditions. Thus, for example, if the response to a first policy violation is to change the time period in which a restriction applies, the modification precedence of the active restrictions and active conditions may be changed after the first policy violation so that a different condition is changed or a restriction is changed if a second policy violation occurs.

In response to a policy violation, the dynamic policy management server 190 may revise the enterprise policy to deny access to the managed application on the user device. In some cases, the dynamic policy management server 190 may revise the enterprise policy to deny access to a hardware or software feature on the user device in response to the notice of the policy violation by the managed application.

The dynamic policy management server 190 may also monitor future actions of the user of the enterprise application. If the dynamic policy management server 190 determines that further policy violations have not occurred, the dynamic policy management server 190 may restore the selected one of the active condition and the active restriction to a previous level and transmitting the restored enterprise usage policy to the user device.

Figure 8:
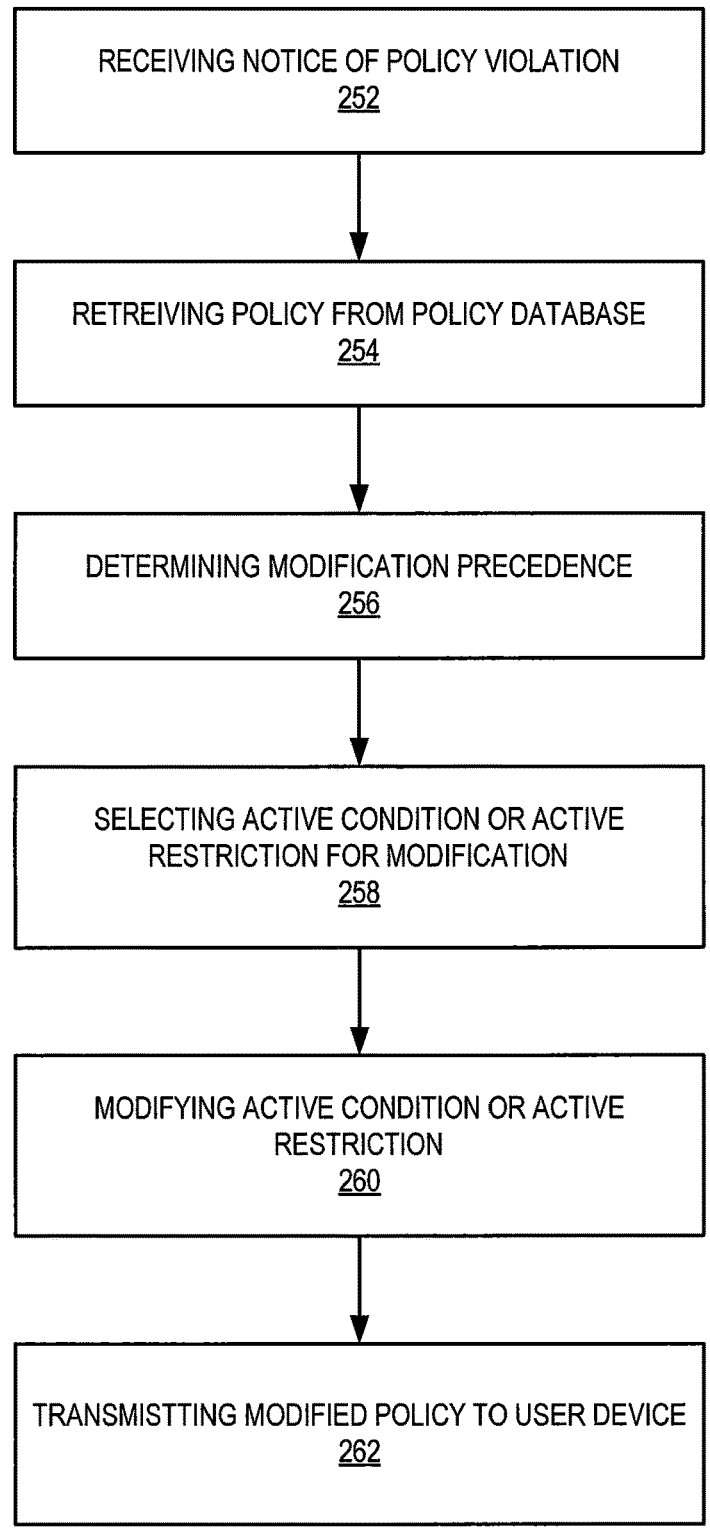
FIG. 8 is a flowchart illustrating operations of dynamically modifying an enterprise policy according to some embodiments.

FIG. 8 is a flowchart that illustrates systems/methods according to some embodiments. Referring to FIG. 8, a method according to some embodiments includes receiving, at a policy management server, a notice of a policy violation of an enterprise usage policy by a managed application on a user device (block 252). The method further includes retrieving the enterprise usage policy from a policy database (block 254), determining a modification precedence of the active condition and the active restriction (block 256), selecting one of the active condition and the active restriction for modification in response to the modification precedence (block 258), modifying the selected one of the active condition and the active restriction in response to the notice of the policy violation to provide a modified enterprise usage policy (block 260), and transmitting the modified enterprise usage policy to the user device (block 262).

Some embodiments described herein provide systems and/or methods for adaptive dynamic policy generation and management, as well as a pro-active enforcement mechanism for a Mobile Application Management (MAM) system including heterogeneous set of users, apps and devices. MAM solutions that depend on manual policy creation by an administrator can be difficult to maintain, and may not be able to adapt to changing demands and needs of the enterprise and of users. Moreover, enforcement of an enterprise policy is typically static in nature. It may be a non-trivial task for an administrator of an enterprise network to monitor all the users in the enterprise domain and to create, maintain and enforce policies that are best suited for the enterprise applications, as well as the users and devices involved. Automatic policy management and pro-active enforcement according to the embodiments described herein may help to reduce the effort required to manage enterprise policies while maintaining the company's IT security.

Two sample use cases are described below.

Sample Use-Case 1:

The ABC Company has deployed a MAM application to manage mobile devices used by company employees. An employee of the company may use a smart phone that is controlled and monitored by the company's MAM system. The company MAM system may define policies for a social networking app running on the employee's device. According to the MAM policy, usage of a camera and microphone inside a restricted area of the company may be restricted.

The IT administrator may set the following policy up in an administrative console of the MAM system:

if Employee→tries to access social media app→at Client Briefing Center→Any Time→Any Network→Allow Access→Deny device features: Camera & Microphone Any deviation to the above mentioned policy will result in a reportable violation. However, the company may have a large number of employees using similar devices. Thus, a number of violations may be reported to the MAM system every day. In this scenario, a dynamic policy management system as described herein can pro-actively change the policy in response to on the employee's usage behavior and/or violation count. If the employee continues to violate policies, the systems/methods described herein can put a more-restrictive enterprise usage policy in place and deny access to the social networking completely instead of just restricting device features. This may encourage the employee to be mindful of the enterprise's policies.

Sample Use-Case 2:

"The employee has a meeting setup at a client briefing center on Wednesday between 9 am and 10 am. The IT administrator may have designated the client briefing center as a sensitive area and created a list of device features that should be restricted there. Therefore, according to an enterprise usage policy, access to camera and microphone of a managed mobile device may be restricted at that location.

The policy may have time conditions, i.e. the restriction may be in effect only during certain hours, such as business hours, and may automatically become inactive after 10 am or whenever the employee exits the client briefing center (by detecting his location), whichever is earlier.

Dynamic policy management and pro-active enforcement may generally result in better controlled usage of a BYOD device inside an enterprise setting. Dynamic policy management may significantly reduce the load on the administrative staff, and may be scalable across a large number of users, apps, and devices. Finally, a dynamic policy management system according to some embodiments may have an adaptive learning system that can learn from the user's behavior and pattern at a granularity of a specific device feature.

In the above-description of various embodiments of the present disclosure, aspects of the present disclosure may be illustrated and described herein in any of a number of patent-eligible classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
    performing operations as follows on a processor of a policy management server:
        receiving a notice of a policy violation of an enterprise usage policy by a managed application on a user device, wherein the enterprise usage policy is administered by the policy management server and wherein the managed application is managed by a mobile application management module on the user device based on the enterprise usage policy;
        retrieving the enterprise usage policy from a policy database, wherein the enterprise usage policy comprises an action, an active condition selected from a plurality of conditions that range in breadth from a least narrow condition to a most narrow condition, and an active restriction selected from a plurality of restrictions that range in breadth from a least narrow restriction to a most narrow restriction;
        determining a modification precedence of the active condition and the active restriction;
        selecting one of the active condition and the active restriction for modification in response to the modification precedence;
        modifying the selected one of the active condition and the active restriction in response to the notice of the policy violation to provide a modified enterprise usage policy with respect to a plurality of user devices assigned to a plurality of users within a user set, wherein the modified enterprise usage policy has one of a broader active condition or a narrower active restriction relative to the enterprise usage policy; and
        responsive to modifying the selected one of the active condition and the active restriction, transmitting the modified enterprise usage policy to the user device for application to future actions of the user device.

2. The method of claim 1, wherein in response to the active condition being selected in response to the modification precedence, modifying the active condition comprises changing the active condition to a less narrow condition among the plurality of conditions.

3. The method of claim 1, wherein in response to the active restriction being selected in response to the modification precedence, modifying the active restriction comprises changing the active restriction to a more restrictive restriction among the plurality of conditions.

4. The method of claim 1, further comprising updating the modification precedence after selecting one of the active condition and the active restriction for modification.

5. The method of claim 1, wherein the enterprise usage policy applies to a selected class of users selected from a plurality of classes of users ranging from a narrowest class of users to a broadest class of users, the method further comprising modifying the enterprise usage policy to apply to a broader class of users than the selected class of users.

6. The method of claim 5, wherein the narrowest class of users comprises a single user.

7. The method of claim 1, further comprising denying access to the managed application on the user device in response to the notice of the policy violation by the managed application.

8. The method of claim 1, further comprising denying access to a hardware feature on the user device in response to the notice of the policy violation by the managed application.

9. The method of claim 1, wherein the enterprise usage policy comprises a geographical condition and/or a temporal condition of the user device.

10. The method of claim 1, further comprising
    monitoring the user device for further policy violations;
    in response to determining that further policy violations have not occurred, removing the modification to the selected one of the active condition and the active restriction to provide a restored enterprise usage policy; and
    transmitting the restored enterprise usage policy to the user device.

11. A system, comprising:
    a processor; and
    a memory coupled to the processor and comprising computer readable program code embodied in the memory that when executed by the processor causes the processor to perform operations comprising:
        receiving a notice of a policy violation of an enterprise usage policy by a managed application on a user device, wherein the enterprise usage policy is administered by the policy management server and wherein the managed application is managed by a mobile application management module on the user device based on the enterprise usage policy;
        retrieving the enterprise usage policy from a policy database, wherein the enterprise usage policy comprises an action, an active condition selected from a plurality of conditions that range in breadth from a least narrow condition to a most narrow condition, and an active restriction selected from a plurality of restrictions that range in breadth from a least narrow restriction to a most narrow restriction;

determining a modification precedence of the active condition and the active restriction;

selecting one of the active condition and the active restriction for modification in response to the modification precedence;

modifying the selected one of the active condition and the active restriction in response to the notice of the policy violation to provide a modified enterprise usage policy with respect to a plurality of user devices assigned to a plurality of users within a user set, wherein the modified enterprise usage policy has one of a broader active condition or a narrower active restriction relative to the enterprise usage policy; and responsive to modifying the selected one of the active condition and the active restriction, transmitting the modified enterprise usage policy to the user device for application to future actions of the user device.

12. The system of claim 11, wherein in response to the active condition being selected in response to the modification precedence, modifying the active condition comprises changing the active condition to a less narrow condition among the plurality of conditions.

13. The system of claim 11, wherein in response to the active restriction being selected in response to the modification precedence, modifying the active restriction comprises changing the active restriction to a more restrictive restriction among the plurality of conditions.

14. The system of claim 11, wherein the computer readable program code further causes the processor to perform operations comprising:

updating the modification precedence after selecting one of the active condition and the active restriction for modification.

15. The system of claim 11, wherein the enterprise usage policy applies to a selected class of users selected from a plurality of classes of users ranging from a narrowest class of users to a broadest class of users, wherein the computer readable program code further causes the processor to perform operations comprising:

modifying the enterprise usage policy to apply to a broader class of users than the selected class of users.

16. The system of claim 11, wherein the computer readable program code further causes the processor to perform operations comprising:

denying access to the managed application on the user device.

17. The system of claim 11, wherein the computer readable program code further causes the processor to perform operations comprising:

denying access to a hardware feature on the user device in response to the notice of the policy violation by the managed application.

18. The system of claim 11, wherein the enterprise usage policy comprises a geographical condition and/or a temporal condition of the user device.

19. The system of claim 11, wherein the computer readable program code further causes the processor to perform operations comprising:

monitoring the user device for further policy violations;

in response to determining that further policy violations have not occurred, removing the modification to the selected one of the active condition and the active restriction to provide a restored enterprise usage policy; and transmitting the restored enterprise usage policy to the user device.

20. A method, comprising:

performing operations as follows on a processor of a policy management server:

receiving a notice of a policy violation of an enterprise usage policy by a managed application on a user device, wherein the enterprise usage policy is administered by the policy management server, and wherein the enterprise usage policy comprises an action, a plurality of active conditions, each active condition having a level selected from a plurality of levels that range from a least narrow level to a most narrow level, and an active restriction selected from a plurality of restrictions that range in breadth from a least narrow restriction to a most narrow restriction;

modifying one of the active conditions to have a broader level and/or modifying the active restriction to have a less narrow restriction in response to the notice of the policy violation to provide a modified enterprise usage policy with respect to a plurality of user devices assigned to a plurality of users within a user set, wherein the modified enterprise usage policy has one of a broader active condition or a narrower active restriction relative to the enterprise usage policy; and responsive to modifying the selected one of the active condition and the active restriction, transmitting the modified enterprise usage policy to the user device for application to future actions of the user device.

* * * * *